United States Patent
Kim et al.

(10) Patent No.: US 8,494,529 B2
(45) Date of Patent: Jul. 23, 2013

(54) SERVER FOR CONTROL PLANE AT MOBILE COMMUNICATION NETWORK AND METHOD FOR CONTROLLING SIPTO BASED SESSION

(75) Inventors: Taehyeon Kim, Gyeonggi-do (KR); Laeyoung Kim, Gyeonggi-do (KR); Hyunsook Kim, Gyeonggi-do (KR); Saso Stojanovski, Paris (FR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 12/860,819

(22) Filed: Aug. 20, 2010

(65) Prior Publication Data
US 2011/0045834 A1 Feb. 24, 2011

Related U.S. Application Data

(60) Provisional application No. 61/235,691, filed on Aug. 21, 2009, provisional application No. 61/236,545, filed on Aug. 25, 2009, provisional application No. 61/301,635, filed on Feb. 5, 2010, provisional application No. 61/302,157, filed on Feb. 7, 2010, provisional application No. 61/329,531, filed on Apr. 29, 2010.

(30) Foreign Application Priority Data

May 11, 2010 (KR) .................. 10-2010-0044162
Jun. 15, 2010 (KR) .................. 10-2010-0056731

(51) Int. Cl.
*H04W 36/00* (2009.01)
(52) U.S. Cl.
USPC ............ 455/438; 455/436; 455/525; 455/410
(58) Field of Classification Search
USPC .............. 455/456.1, 404.1, 436, 525, 410, 455/438; 709/203; 370/241, 254, 328, 331
See application file for complete search history.

(56) References Cited

U.S. PATENT DOCUMENTS 7,444,238 B1 * 10/2008 Opitz ........................ 701/454
2005/0090225 A1 * 4/2005 Muehleisen et al. ....... 455/404.1
(Continued)

FOREIGN PATENT DOCUMENTS

WO 2009/028209 3/2009

OTHER PUBLICATIONS

3GPP TR 23.8xy V0.2.0 (Sep. 2009) 3rd Generation Partnership Project; Technical Specification Group Services and System Aspects; Local IP Access and Selected IP Traffic Offload;(Release 10).*

(Continued)

*Primary Examiner* — Joseph Arevalo
(74) *Attorney, Agent, or Firm* — Lee, Hong, Degerman, Kang & Waimey

(57) ABSTRACT

Disclosed is a method of controlling a session in a serving server taking charge of the control plane within a mobile communication network. The control method may include receiving, by the serving server, a tracking area update (TAU) request message of a terminal from a target base station; retrieving, by the serving server, a previous server that has taken charge of the control plane for the terminal; receiving, by the serving server and from the retrieved previous server, a context response message comprising information indicating that a session for the terminal had been established to be passed through a path over the nodes within a fixed network different from a mobile communication network; deciding, by the serving server, whether gateway relocation is needed; releasing, by the serving server, the established session; transmitting, by the serving server, an accept message comprising information for the processing result to the terminal through the target base station; and establishing, by the serving server a session passing through a path over the nodes within a fixed network different from a mobile communication network based on the information.

15 Claims, 10 Drawing Sheets

U.S. PATENT DOCUMENTS

| | | | |
|---|---|---|---|
| 2006/0095969 A1* | 5/2006 | Portolani et al. | 726/23 |
| 2007/0243872 A1 | 10/2007 | Gallagher et al. | |
| 2008/0076393 A1 | 3/2008 | Khetawat et al. | |
| 2008/0267153 A1 | 10/2008 | Mukherjee et al. | |
| 2008/0275950 A1* | 11/2008 | Jordan | 709/203 |
| 2009/0131072 A1* | 5/2009 | Razdan et al. | 455/456.1 |
| 2009/0257353 A1* | 10/2009 | Song et al. | 370/241 |
| 2011/0116469 A1* | 5/2011 | Bi et al. | 370/331 |

OTHER PUBLICATIONS

Vodafone et al., "Selected IP Traffic Offload", 3GPP TSG-SA WG1 Meeting #47, S1-093341, Aug. 2009.

Vodafone et al., "Update to the SA2 WID for Local IP Access & Internet Offload", 3GPP TSG-SA WG1 Meeting #47, S1-093338, Aug. 2009.

* cited by examiner

SERVER FOR CONTROL PLANE AT MOBILE COMMUNICATION NETWORK AND METHOD FOR CONTROLLING SIPTO BASED SESSION

RELATED APPLICATION

Pursuant to 35 U.S.C. §119, this application claims the benefit of U.S. Provisional Applications No. 61/235,691 filed on Aug. 21, 2009, No. 61/236,545 filed on Aug. 25, 2009, No. 61/301,635 filed on Feb. 5, 2010, No. 61/302,157 filed on Feb. 7, 2010 and No. 61/329,531 filed on Apr. 29, 2010 and the benefit of earlier filing date and right of priority to Korean Applications No. 10-2010-0044162, filed on May 11, 2010 and No. 10-2010-0056731, filed on Jun. 15, 2010, the contents of which is incorporated by reference herein in its entirety.

BACKGROUND OF THE INVENTION

1. Field of the Invention

The present invention relates to a mobile communication system.

2. Description of the Conventional Art In order to study new technologies related to the 4th generation mobile communications, the 3rd Generation Partnership Project (3GPP) who enacts the technical standards of 3G mobile communication systems has proceeded with studies on the Long Term Evolution/System Architecture Evolution (LTE/SAE) technologies since the end of 2004 as a part of the effort to optimize and enhance the performance of 3GPP technologies.

The SAE led by 3GPP SA WG2 is a study on network technologies for the purpose of determining a network structure together with the LTE work of 3GPP TSG RAN and supporting mobility between heterogeneous networks. In recent years, the SAE has been considered one of the latest important standard issues in 3GPP. It is a work to develop a system supporting various radio access technologies on the basis of 3GPP IP systems, and has been progressed to aim at an optimized packet based system that minimizes a transmission delay with enhanced transmission capability.

A high-level reference model defined by 3GPP SA WG2 includes a non-roaming case and roaming cases having various scenarios, and the detailed description thereof is given in 3GPP standard documents TS 23.401 and TS 23.402. In FIG. 1, there is illustrated a structural diagram of a network in which the model is schematically reconfigured.

FIG. 1 is a structural diagram illustrating an evolved mobile communication network.

One of the distinctive characteristics of the network structure of FIG. 1 is that it is based on a 2-tier model having an eNode B of the Evolved UTRAN and a gateway of the core network. The eNode B has a similar function, although not exactly the same, to the eNode B and RNC of the existing UMTS system, and the gateway has a function similar to the SGSN/GGSN of the existing system.

Another distinctive characteristic is that the control plane and the user plane between the access system and the core network are exchanged with different interfaces. While one Iu interface exists between the RNC and the SGSN in the existing UMTS system, two separate interfaces, i.e., S1-MME and S1-U, are used in the Evolved Packet Core (SAE) system since the Mobility Management Entity (MME) 51 taking charge of the processing of a control signal is structured to be separated from the gateway (GW). For the GW, there are two types of gateways, a serving gateway (hereinafter, 'S-GW') 52 and a packet data network gateway (hereinafter, 'PDN-GW' or 'P-GW') 53.

FIG. 2 is a view illustrating a relation between (e)NodeB and Home (e)NodeB.

In the 3rd or 4th generation mobile communication systems, attempts continue to increase their cell capacity in order to support high-capacity and bi-directional services such as multimedia contents, streaming, and the like.

In other words, with the development of communication and widespread multimedia technologies, various high-capacity transmission technologies are required, and accordingly, a method of allocating more frequency resources is used to increase radio capacity, but there is a limit to allocate more frequency resources to a plurality of users with restricted frequency resources.

In order to increase cell capacity, there has been an approach in which high frequency bandwidth is used and the cell diameter is reduced. If a cell having a small cell radius such as a pico cell is applied, it is possible to use a higher bandwidth than the frequency that has been used in the existing cellular system, thereby providing an advantage capable of transmitting more information. However, more base stations should be installed in the same area, thereby having a disadvantage of high investment cost.

In recent years, a femto base station such as Home (e)NodeB 30 has been proposed among the approaches for increasing cell capacity using such a small cell.

Studies on the Home (e)NodeB 30 have been started by 3GPP Home (e)NodeB WG3, and also in recent years, actively proceeded by SA WG.

The (e)NodeB 20 illustrated in FIG. 2 corresponds to a macro base station, and the Home (e)NodeB 30 illustrated FIG. 2 may be a femto base station. This specification will be described based on the terms of 3GPP, and the term (e)NodeB is used when referring to both NodeB and eNodeB. Also, the term Home (e)NodeB is used when referring to both Home NodeB and Home eNodeB.

The interface illustrated in a dotted line denotes the transmission of control signals between the (e)NodeB 20 or Home (e)NodeB 30 and the MME 51. Also, the interface illustrated in a solid line denotes the transmission of data of the user plane.

FIG. 3 is a view illustrating a problem according to the related art.

As illustrated in FIG. 3, if traffic is overloaded or congested at an interface between the (e)NodeB 20 and the S-GW 52, or traffic is overloaded or congested at an interface between the Home (e)NodeB 30 and the S-GW 52, then downlink data to the UE 10 or upload data from the UE 10 is failed to be properly transmitted.

Also, if an interface between the S-GW 52 and the PDN-GW 53 or an interface between the PDN-GW 53 and an Internet Protocol (IP) service network of the mobile communication operator is overloaded or congested, then downlink data to the UE 10 or upload data from the UE 10 is failed to be properly transmitted.

Also, when UE is handed over from a cell being currently serviced to another cell, if the another cell is overloaded, then it will cause a problem of dropping the service of the UE.

In order to solve the foregoing problem, mobile communication operators have changed the S-GW 52 and the PDN-GW 53 to high-capacity devices or have installed more new devices, but it has a disadvantage of requiring very high cost. Furthermore, it has a disadvantage that the amount of transmitted or received data increases exponentially over time, and then overloaded in a short time.

On the other hand, various schemes for optimizing the S-GW 52 and the PDN-GW 53 without installing more mobile communication networks as described above have been presented. For example, there has been presented a technology of making a selected IP traffic offload, namely, SIPTO. It provides a path through nodes of a public network which is not the mobile communication network, i.e., nodes of a fixed network, for the specific IP traffic (for instance, Internet service) of the UE without transmitting or receiving through a path over the mobile communication network.

FIG. 4 is a view illustrating the concept of Selected IP Traffic Offload (SIPTO).

Referring to FIG. 4, a mobile communication system such an Evolved Packet System (EPS) is illustrated in an exemplary manner. The EPC system may include (e)NodeB 20, MME 51, S-GW 52, and P-GW 53. Furthermore, Home (e)NodeB 30 is illustrated therein.

As illustrated in the drawing, the Selected IP Traffic Offload (SIPTO) technology may allow specific IP traffic (for instance, Internet service) of the UE 10 to be offloaded to nodes of a fixed network 70 without passing through nodes within an IP service network 60 of the mobile communication operator.

For example, if the UE 10 is allowed to access the (e)NodeB 20, then the UE 10 can create a session passing through a fixed network 70 such as a public communication network over the (e)NodeB 20 and perform an IP network service through the session. At this time, operator policy and subscription information may be considered.

In order to create the session as described above, a gateway, i.e., a local gateway taking charge of part of the function of GGSN in case of UMTS or a local gateway taking charge of part of the function of P-GW (PDN Gateway) in case of EPS may be provided and used at a position adjacent to the (e)NodeB 20.

This type of local gateway is called a local GGSN or local P-GW. The function of the local GGSN or local P-GW is similar to a GGSN or P-GW.

On the other hand, the SIPTO technology does not use a specific APN. In other words, the offload to IP traffic is supported at the discretion of the core network but does not affect the UE.

As described above, the SIPTO technology has proposed the concept of creating a session to offload data of the UE to a wire network such a public communication network.

SUMMARY OF THE INVENTION

In the foregoing related art, a scheme of creating a session for the data has been proposed to offload data of the UE to a fixed network such as a public communication network when the UE stays for a long time at a geographically predetermined position.

However, the related art does not consider the mobility of the UE. In other words, the foregoing related art has considered a situation that the UE stays at a predetermined position similarly to the wireless LAN technology.

However, the UE may move frequently or over a long distance. Accordingly, there is a problem that it may not be realized to provide services for a terminal having a wide moving range based on the foregoing related art.

An objective of the present invention is to solve the foregoing problems. In other words, one aspect of the present invention is to propose a technology of allowing a session for the data of the UE offloaded to a fixed network such a public communication network to be handed over if the UE is moved. In other words, an objective of the present invention is to propose a mobility management method of a session for the offloaded data.

In addition, another aspect of the present invention is to propose a method of processing a session for the offloaded data according to the radio capability of a target base station if the data of the UE located within the coverage of a source base station, for instance, a source (e)NodeB is offloaded to a fixed network such as a public communication network, and then the UE is moved into the coverage of a target base station, for instance, target (e)NodeB.

In order to accomplish the foregoing objective, according to the present invention, there is provided a method of controlling a session in a serving server taking charge of the control plane within a mobile communication network. The method of controlling the session may include receiving, by the serving server, a tracking area update (TAU) request message of a terminal from a target base station; retrieving, by the serving server, a previous server that has taken charge of the control plane for the terminal; receiving, by the serving server and from the retrieved previous server, a context response message comprising information indicating that a session for the terminal had been established to be passed through a path over the nodes within a fixed network different from a mobile communication network; deciding, by the serving server, whether gateway relocation is needed; releasing, by the serving server, the established session; transmitting, by the serving server, an accept message comprising information for the processing result to the terminal through the target base station; and reestablishing, by the serving server a session passing through a path over the nodes within a fixed network different from a mobile communication network based on the information.

The context response message may be a Context Response message, and a message comprising information for the processing result may be a TAU Accept message or Deactivate EPS Bearer Context Request message.

In order to accomplish the foregoing objective, according to the present invention, there is provided a server taking charge of the control plane within a mobile communication network. The server may include a transceiver; and a processor configured to control the transceiver.

On the other hand, in order to accomplish the foregoing objective, according to the present invention, there is provided a method of controlling a session in a serving server taking charge of the control plane within a mobile communication network. The control method may include receiving, by the serving server, a handover request message comprising an ID of a target base station from a source base station managing a session of a terminal; determining, by the serving server, another server that is to take charge of the control plane for the target base station, wherein the session being performed is established to be passed through a path over the nodes within a fixed network different from a mobile communication network; transmitting, from the serving server to the determined another server, a relocation request message comprising information indicating that the session being performed is established to be passed through a path over the nodes within a fixed network different from a mobile communication network; transmitting, from the determined another server to the serving server, a relocation response message comprising information for the processing result; releasing, by the serving server, the session being performed; transmitting, from the serving server to the terminal, a handover command message comprising the processing result through the source base station; and establishing, by the determined another server, a new session replacing the session being performed.

The control method may further include determining, by the determined another server, a target gateway based on the information; and establishing, by the determined another server a session with the target gateway. The estabilshed session may be a SIPTO-based session or general session.

The control method may further include transmitting a request message to the target base station; and receiving a request response message from the target base station.

The handover request message may be a S1-AP protocol-based handover required message, and the relocation request message may be a forward relocation request message.

The request message may be a handover request message, and the response message may be a handover response message.

The serving server and the determined server are mobility management entities (MMEs)/SGSNs (control plane management), and the source base station and the target base station are (e)NodeBs. The gateway is S-GW/SGSN (user plane management).

The information may be SIPTO_Session_Indicator.

The information may be set together with an access point name (APN), or set in the unit of bearer. In the releasement step, at least one or more sessions associated with an APN among sessions in which the terminal is being performed may be released if the information is set together with the APN. Otherwise, all the sessions in which the terminal is being performed may be released in the unit of bearer if the information is set in the unit of bearer.

The processing result may indicate a processing result for a SIPTO-based session. The processing result may be a result or cause of SIPTO parameter.

Meanwhile, in order to accomplish the foregoing objective, according to the present invention, there is provided a server taking charge of the control plane within a mobile communication network; the server comprising: a transceiver; and a processor configured to control the transceiver.

The processor determines a serving server taking charge of the control plane for the target base station, and then transmits a relocation message comprising information indicating that the session being performed is established to be passed through a path over the nodes within a fixed network different from a mobile communication network to the determined another server if a handover request message comprising an ID of a target base station is received from a source base station performing a session with a terminal through the transceiver, and the processor releases the session being performed and transmits a handover command message comprising the processing result to the source base station if a relocation response message comprising information for the processing result is received from the determined another server.

According to the present invention, data transmitted or received through a mobile communication network is reduced, thereby solving the problem in the related art.

Therefore, according to the present invention, a mobile communication network is not overloaded, thereby reducing the cost of additional devices installation.

In addition, according to the present invention, a session for the data offloaded to a fixed network such as a public communication network is suitably moved as the UE is moved into the coverage of a target base station, thereby stably maintaining and effectively managing services provided to the UE.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
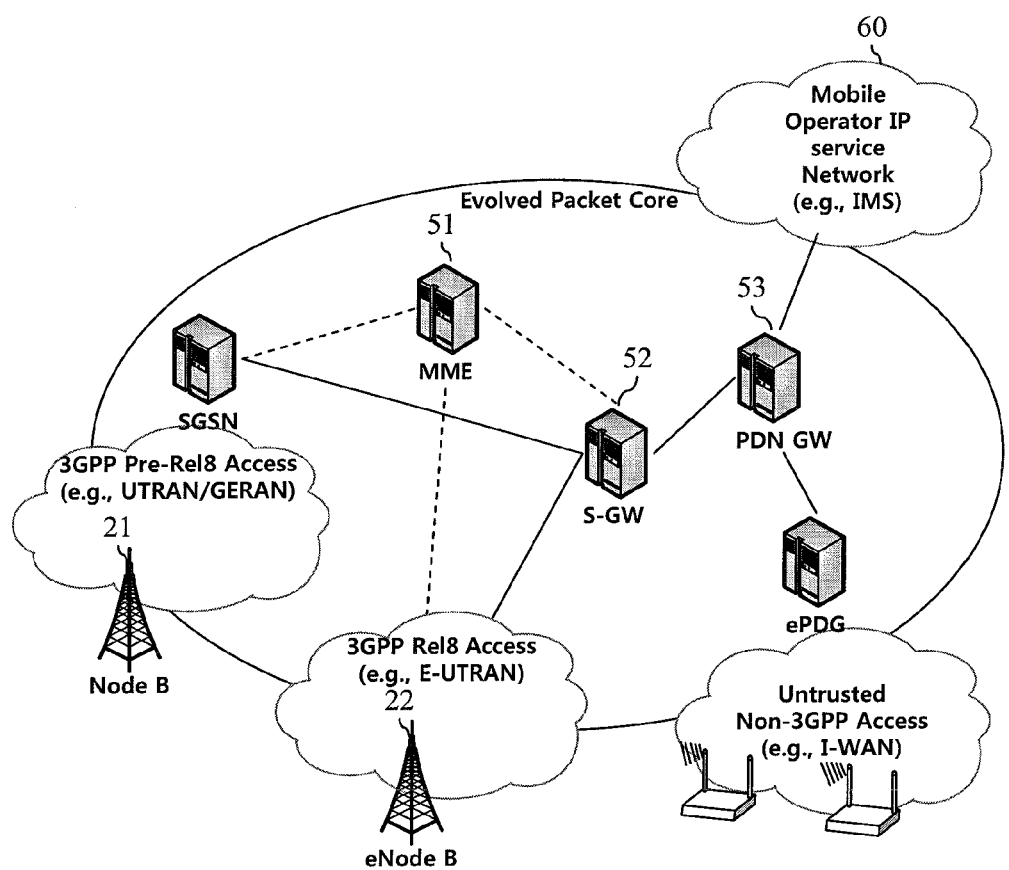
FIG. 1 is a structural diagram illustrating an evolved mobile communication network.
Figure 2:
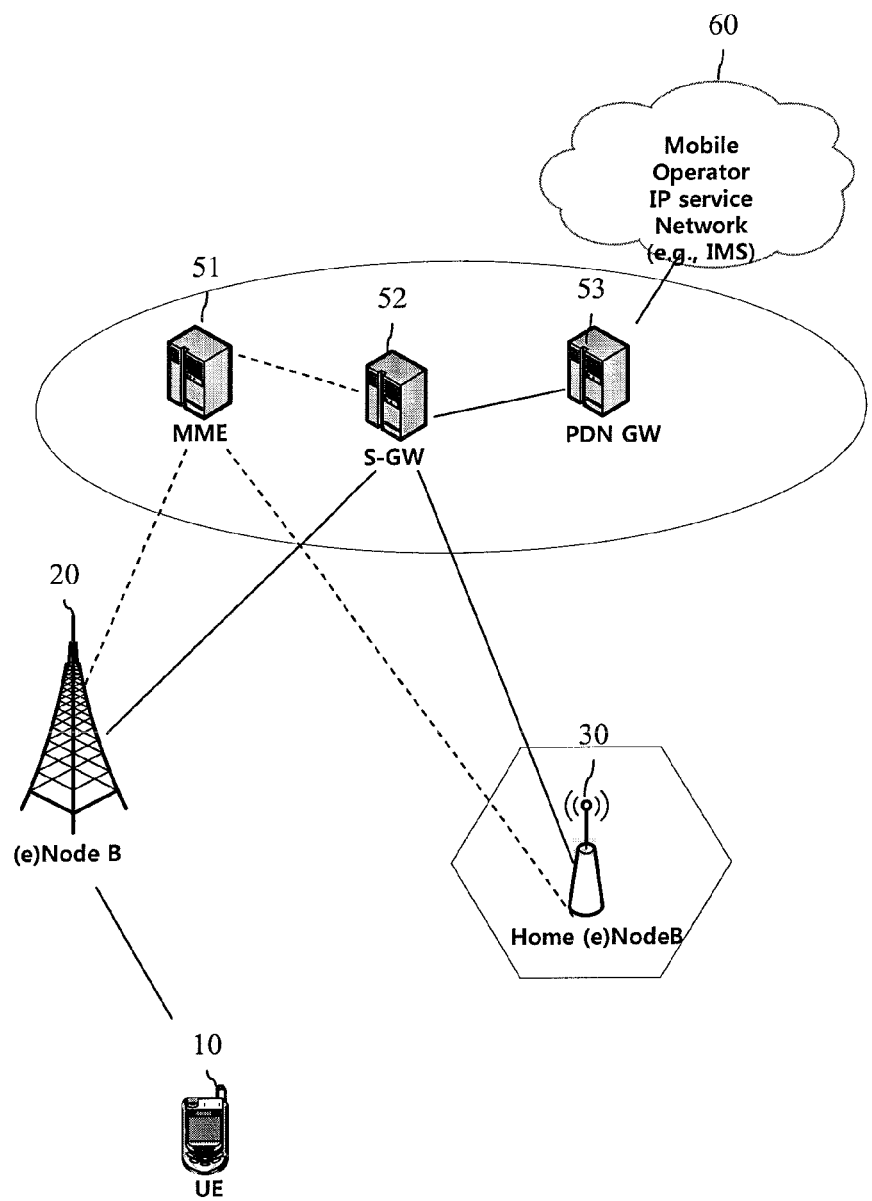
FIG. 2 is a view illustrating a relation between (e)NodeB and Home (e)NodeB.
Figure 3:
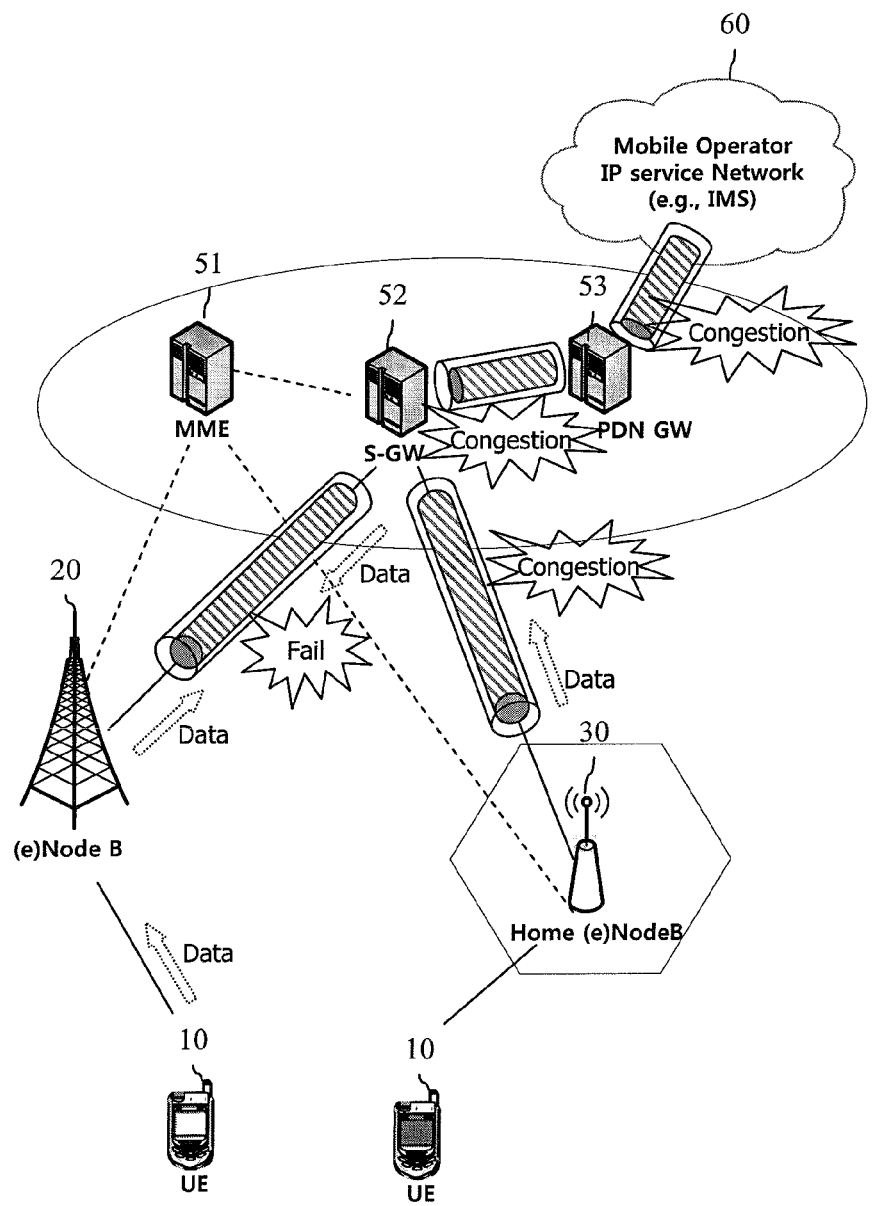
FIG. 3 is a view illustrating a problem according to the related art.
Figure 4:
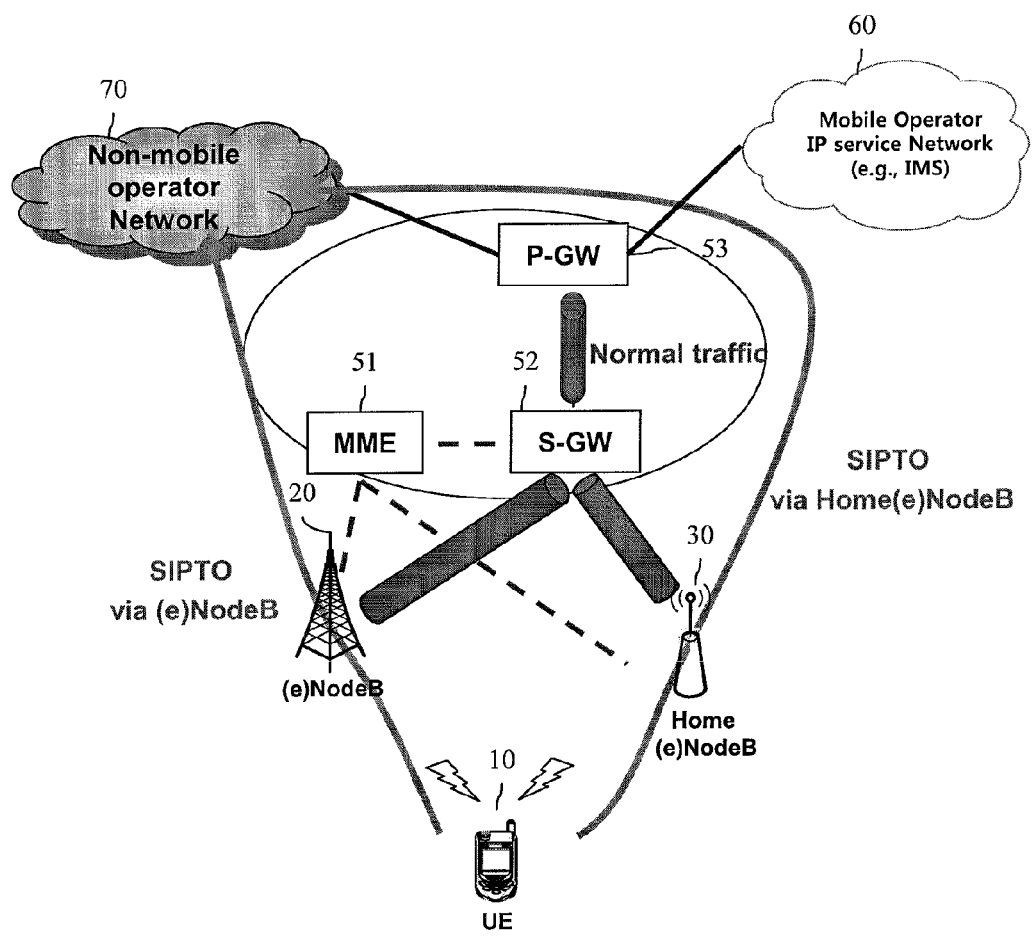
FIG. 4 is a view illustrating the concept of Selected IP Traffic Offload (SIPTO)

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term "terminal" is used, but the terminal may be also called a user equipment (UE), a mobile equipment (ME), and a mobile station (MS). Furthermore, the terminal may be portable equipment such as a portable phone, a PDA, a smart phone, and a notebook, or non-portable equipment such as a PC, and a vehicle-loaded device.

Furthermore, the term "Home (e)NodeB" is used below, but the Home (e)NodeB may be called a femto base station, a Home NodeB, and a Home eNodeB.

Definition of Terms

Hereinafter, the terms used in this specification will be briefly defined prior to describing with reference to the drawings.

UMTS: It is an abbreviation of Universal Mobile Telecommunication System and denotes the 3rd mobile communication network.

EPS: It is an abbreviation of Evolved Packet System, and denotes a core network supporting a Long Term Evolution (LTE) network. It is a network in the form of an evolved UMTS.

PDN (Public Data Network): An independent network in which a server providing services is located.

APN (Access Point Name): As the name of an access point managed by a network, it is provided to the UE. Based on the name of the access point, a suitable PDN-GW for data transmission and reception.

Access Control: A control procedure for allowing the UE to be used at an access system such as Home (e)NodeB, or to be moved to another access system.

TEID (Tunnel Endpoint Identifier): An end point ID of a tunnel configured between nodes within a network. It is set up for each section in the unit of each bearer of the UE.

NodeB: It is installed outdoors as a base station of the UMTS network, and the size of the cell coverage corresponds to a macro cell.

eNodeB: It is installed outdoors as a base station of the Evolved Packet Core (EPC) network, and the size of the cell coverage corresponds to a macro cell.

(e)NodeB: It is a term indicating both NodeB and eNodeB.

Home NodeB: It is installed indoors as a base station of the UMTS network, and the size of the cell coverage corresponds to a femto cell.

Home eNodeB: It is installed indoors as a base station of the EPS network, and the size of the cell coverage corresponds to a femto cell.

Home (e)NodeB: It is a term indicating both Home NodeB and Home eNodeB.

Home (e)NodeB Gateway: It is connected to at least one Home (e)NodeB as a gateway performing a role of interfacing with a core network.

Home (e)NodeB Subsystem: It is a form of combining a Home (e)NodeB with a Home (e)NodeB Gateway into a set to manage a radio network. Both the Home (e)NodeB subsystem and the Home (e)NodeB perform a role of managing a radio network to link with a core network, and thus considered as an aggregate form. Accordingly, the terms "Home (e)NodeB" and "Home (e)NodeB subsystem" are interchangeably used below.

MME: It is an abbreviation of Mobility Management Entity, and performs a role of controlling each entity within EPS to provide a session and mobility for the UE.

Closed Subscriber Group (CSG): It denotes a group having at least one Home (e)NodeB. The Home (e)NodeBs belonging to the CSG have a same CSG ID. Each user receives a license for each CSG.

Closed Access Mode: It denotes a mode in which a Home (e)NodeB is operated as a CSG cell. It operates in a method of allowing an access only to a user terminal that is allowed for the relevant cell. In other words, a terminal having an authority for the particular CSG IDs supported by a Home (e)NodeB is only accessible.

Open Access Mode: It denotes a mode in which a Home (e)NodeB is operated in a method similar to a normal cell (non-CSG cell) without the concept of CSG. In other words, it is operated like a normal (e)NodeB.

Hybrid Access Mode: It denotes a mode in which a Home (e)NodeB is operated as a CSG cell, but its access is also allowed to an non-CSG subscriber. The access is allowed for a user terminal having a particular CSG ID that can be supported by the relevant cell to provide a Home (e)NodeB service, and operated in a method in which even a terminal having no CSG authority is allowed to access.

Selected IP Traffic Offload (SIPTO): Technology for offloading traffic to a fixed network such as the Internet or the like, without using a network of the mobile communication operator when the UE transmits specific IP traffic through Home (e)NodeB or (e)NodeB.

Local Gateway: It denotes a gateway for enabling SIPTO through the Home (e)NodeB or (e)NodeB, i.e., for enabling data to be directly transmitted to a fixed network without passing through a core network. The local gateway is located between the Home (e)NodeB or (e)NodeB and a fixed network, thereby creating a bearer between the Home (e)NodeB or (e)NodeB and the fixed network, creating a bearer between the Home (e)NodeB and the local network, and enabling data transmission through the created bearer.

Session: A session is a path for transmitting data, and the unit thereof may be PDN, bearer, IP flow, and the like. The difference between each unit may be classified with an object network overall unit (APN or PDN unit), a unit (bearer unit) classified with QoS within the unit, and a destination IP address unit.

UE Context: Situation information of the UE used to manage the UE in a network, namely, situation information configured with a UE id, mobility (current location, etc.), and an attribute of the session (QoS, priority, etc.)

Description for the Concept of Schemes Proposed by this Specification

According to this specification, there is proposed an architecture of the technology of allowing specific IP traffic (for instance, Internet services) of the UE to be offloaded, namely, SIPTO, to a path passing through the nodes over a public network, which is not a mobile communication network, i.e., the nodes of a fixed network, without transmitting or receiving through the mobile communication network when supporting (e)NodeB or Home (e)NodeB in a mobile communication system such as 3GPP Universal Mobile Telecommunication System (UMTS)/Evolved Packet System (EPS).

In addition, according to this specification, there is proposed a scheme capable of maintaining a session being performed even when the UE is moved, by supplementing the SIPTO technology.

Specifically, a scheme proposed in this specification will consider capability of radio access, QoS required in a session, mobility, and the like to maintain a session for offloaded data according to the SIPTO technology even when the UE is moved.

Here, the capability of radio access is referred to as the capability according to whether there exists any SIPTO-enabled local gateway in the neighborhood, operator setting (on/off of the SIPTO function) or policy, and the like. Prior to the SIPTO technology being applied, all base stations are thought to have the same capability, but their radio access capability may be different in case of applying the SIPTO technology.

In the SIPTO technology, accordingly, it may be required to check whether the function is applied for each location whenever the UE moves to another cell. One actual terminal may create/use several sessions when needed. For example, some sessions may pass through a core network, and the remaining sessions may be offloaded to be passed through a fixed network such as a public communication network. At this time, a session passing through the core network can be maintained through handover even though the UE is moved into the coverage of a target base station. However, a session offloaded to be passed through a fixed network such as a communication network among the several sessions may have to be deleted or terminated to create a new session through the target base station according to the SIPTO technology. In this specification, there is proposed a method of providing effective mobility to continuously maintain a service in consideration of the circumstance.

Hereinafter, it will be described in detail with reference to the accompanying drawings.

Figure 5:
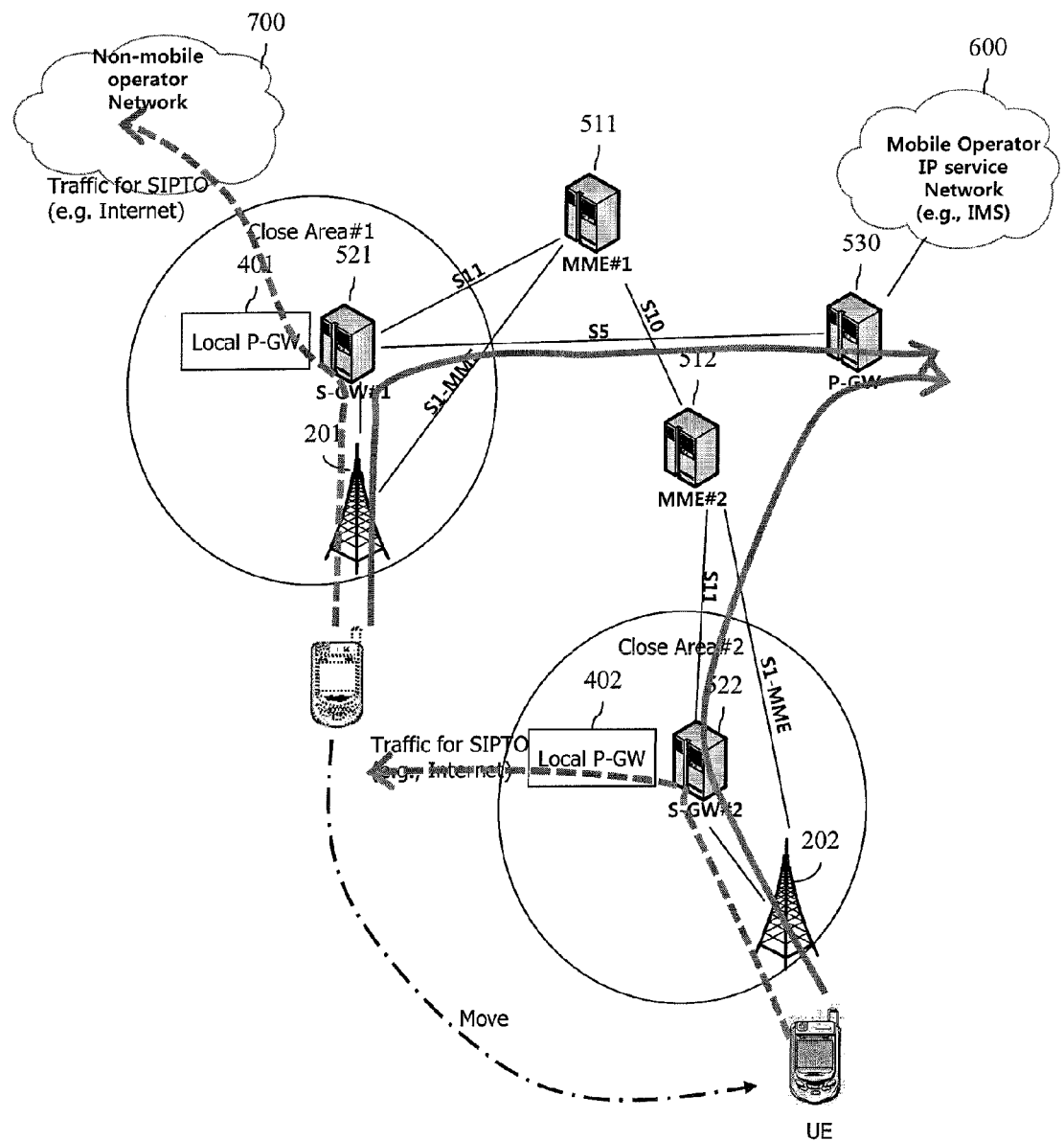
FIG. 5 is an exemplary view illustrating an architecture according to the present invention.

FIG. 5 is an exemplary view illustrating an architecture according to the present invention.

Referring to FIG. 5, it is illustrated an exemplary mobile communication system such as an evolved packet system (EPS). The EPS system may include a source base station 201, a target base station 202, a source local P-GW 401, a target local P-GW 402, a source MME 511, a target MME 512, a source S-GW 521, a target S-GW 522, a source P-GW 531, and a target P-GW 532. The source base station 201 and the target base station 202 may be (e)NodeB or Home (e)NodeB.

The base stations 201, 202 (hereinafter, commonly referred to as "200"), MMEs 511, 512 (commonly referred to as "510"), S-GWs 521, 522 (commonly referred to as "520"), and P-GWs 531, 532 (commonly referred to as "530") as illustrated in FIG. 5 are on the basis of EPS.

The local gateways 401, 402 (hereinafter, commonly referred to as "400") are located between the base station 200 and a fixed network 700, which are gateways for enabling SIPTO through the base station 200. The local gateway 400 is allowed to create a session through a path between the base station 200 and the fixed network 700 and to enable data transmission through the generated bearer.

The local gateway 400 may include part of all of the functions of PDN-GW for an EPS system, or may include part of all of the functions of gateway GPRS support node (GGSN) for UMTS. However, the local gateway 400 may be allowed to generate a bearer through a path between the base station 200 and the fixed network 700, and therefore, it is differentiated from P-GW 520 of EPS or GGSN of UMTS that generates a bearer through a path to the mobile communication network 600. So, it may be called a local P-GW in EPS, or may be called a local GGSN in UMTS.

On the other hand, though the system illustrated in FIG. 5 is on the basis of EPS, SIPTO illustrated in FIG. 5 may be also applied to a 3GPP Universal Mobile Telecommunication System (UMTS). In the 3GPP UMTS, both the function of the control plane in MME 510 and the function of the user plane in S-GW 520 may be carried out in a Serving GPRS Support Node (SGSN) (not shown).

The operation will be described below with reference to FIG. 5.

If the UE 100 requests a service, then SGSN or MME which is a server taking charge of control functions within the core network determines whether data of the service requested by the UE 100 can be offloaded to the fixed network 700. At this time, the access point provided through the fixed network 700 such as the public network may be same as the mobile communication network 600. In other words, the access point name (APN) indicating the name of an access point may not be specified additionally for SIPTO. Therefore, when the UE 100 attempts to access the source base station 201, for instance, (e)NodeB, the UE 100 may use a general APN without using a specific APN.

In this manner, the UE 100 does not use a specific APN when attempting an access, and thus a server within the core network, for instance, the MME 510 in EPS or Serving GPRS Support Node (SGSN) in UMTS can determine whether an access of the UE 100 is to be offloaded to the nodes of the fixed network 700 such as the public network. At this time, a control server within the core network, for instance, the MME 510 may determine whether data by the requested service is to be offloaded to a fixed network 700 such as the public network by considering whether a base station accessed by the UE 100 is the (e)NodeB or Home(e)NodeB, or whether SIPTO is supported by the base station.

If it is determined that the data is offloaded, then a session for the data of the service is set to be offloaded to be passed through the fixed network 700. In other words, a session for the data transmitted and or received to and/or to the UE 100 is passed through the source base station 201, for instance, a radio section with (e)NodeB, and the fixed network 700 with the source local gateway 401 (i.e., local GGSN or local P-GW). In other words, the control for bearer setup (control plane) through the fixed network 700 such as a public network is carried out through the server within the core network, for instance, the source MME 511, and an actual bearer (user plane) is generated by passing through the fixed network 700 and the source base station 201.

The offloaded session may be called a SIPTO-based session. Such a SIPTO-based session is required to be distinguished from a general session. The general session may continue to maintain the service using an existing handover procedure even when the UE is moved into the coverage of a target base station. However, in case of a SIPTO-based session, it is dependent on the characteristic of the local gateway and the location of the base station.

Accordingly, if the session is established, the source MME 511 configures a parameter indicating that the established session is a SIPTO-based session, for instance, SIPTO_Session_indicator within the UE context.

On the other hand, if the UE 100 is moved into the coverage of the target base station 202, then a control server within the core network, for instance, the source MME 511 determines whether a session in which the UE 100 is being performed is a SIPTO-based session. In order to determine whether it is the SIPTO-based session, the source MME 511 may check the parameter, for instance, SIPTO_Session_indicator.

In case where mobility is provided for the session being performed, it will follow the existing mobility procedure. The source MME 511 may determine a suitable target MME 512, and transmit the UE context or a parameter indicating that the session being performed is a SIPTO-based session, for instance, SIPTO_Session_indicator.

Then, the target MME 512 may determine whether to maintain the SIPTO-based session by considering whether SIPTO is supported in the target base station 202. Also, operator policy, QoS, and the like may be further considered.

Furthermore, if the UE is moved into the coverage of the target base station 202, then a local P-GW or local GGSN through which data of the UE 100 is passed may be required to be changed. In this case, capability of radio access, QoS required for a session, mobility, and the like may be considered.

If the local P-GW or local GGSN should be changed, then the source MME 511 or SGSN transfers such a cause to the UE 100, thereby inducing to disconnect (terminate) a current session and request a new session. The induction may be carried out by a source MME or SGSN for the source base station, or a target MME/SGSN for the target base station.

Hereinafter, Referring to FIGS. 6 through 8, the detailed control procedure will be described according to a first and a second embodiment.

To promote the understanding for the detailed control procedure, parameters used in the embodiments of the present invention will be described as follows.

First, to support the mobility of a session offloaded to the fixed network 700, UE context information should be effectively transferred between the nodes taking charge of mobility. In other words, the mobility of a SIPTO session can be managed by distinguishing which session is for SIPTO in MME or SGSN. The discernment may be carried out in the unit of PDN, bearer, and IP flow.

For this purpose, the following parameters can be exchanged.

1) SIPTO_Session_indicator: Indicate whether it is a session for data traffic to be offloaded to a fixed network (non-wireless network) such as a public network, i.e., a SIPTO-based session (SIPTO is enabled). When performing handover, Tracking Area Update (TAU), or Routing Area Update (RAU), it may be included in the UE context and transferred between network servers taking charge of mobility, namely, MMEs or SGSNs.

When the SIPTO_Session_indicator is applied in the unit of PDN in the subscriber information, it may be considered together with APN, and thus it may be known that all sessions associated with the APN are subject to SIPTO, and it may be known that the relevant session is subject to SIPTO when it is applied in the unit of session (bearer or IP address).

2) Result or cause of SIPTO parameter: Indicate the processing result for a SIPTO-based session when it is operated in association with mobility. In other words, it may be transferred by a source MME/SGSN or target MME/SGSN, and the UE 100 may delete the session to request a new PDN.

Figure 6:
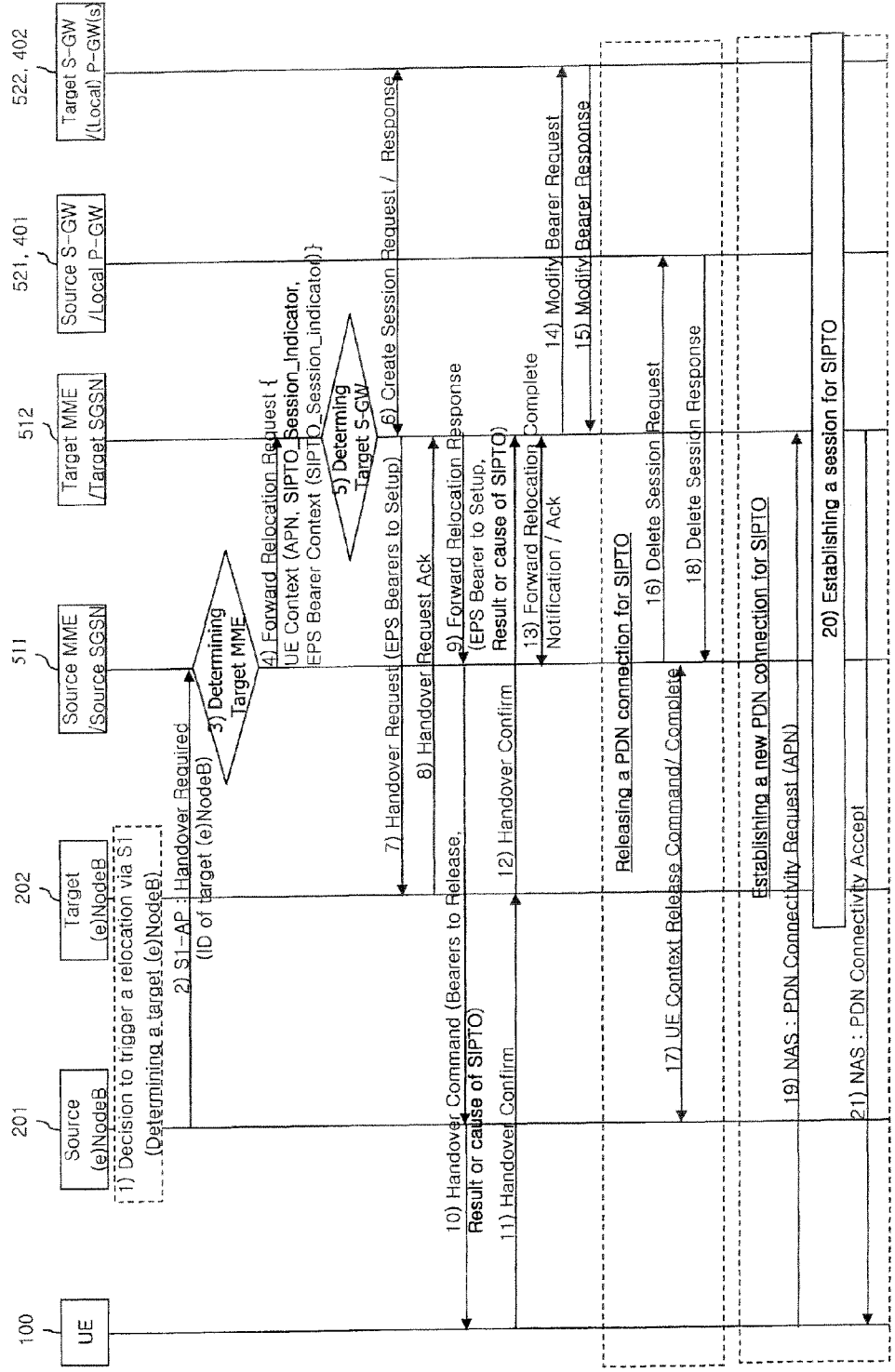
FIG. 6 is a flow chart illustrating a control procedure of SIPTO according to a first embodiment of the present invention.
Figure 7:
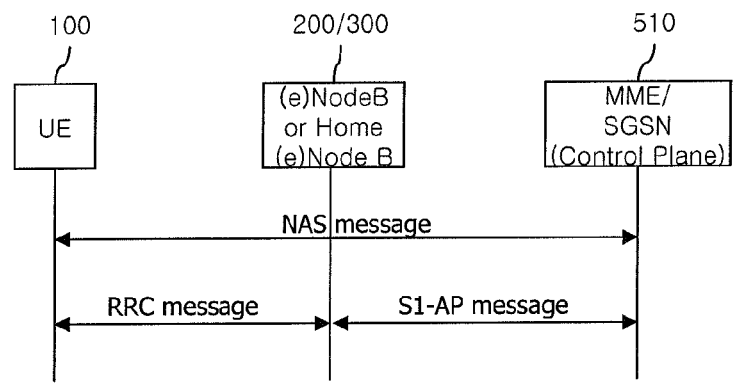
FIG. 7 is an exemplary view illustrating the protocol of a message illustrated in FIG. 6.

FIG. 6 is a flow chart illustrating a control procedure of SIPTO according to a first embodiment of the present invention. FIG. 7 is an exemplary view illustrating a protocol of the message illustrated in FIG. 6.

Prior to specifically describing each procedure with reference to FIG. 6, messages illustrated in FIG. 6 will be briefly described as follows with reference to FIG. 7.

The messages transmitted or received between the UE 100 and the (e)NodeB 200 or Home (e)NodeB 300 are based on the Radio Resource Control (RRC) protocol. The messages transmitted or received between the (e)NodeB 200 or Home (e)NodeB 300 and the MME 510 SGSN (not shown) are based the S1 Application Protocol (S1-AP).

The messages transmitted or received between the UE 100 and the MME 510 or SGSN (not shown) are based on the Non-Access Stratum (NAS) protocol. The messages based on the NAS protocol are encapsulated in a message based on the RRC protocol and the S1-AP message and then transmitted.

Hereinafter, prior to specifically describing with reference to the drawing, the operation according to the first embodiment will be briefly described as follows.

If a SIPTO-based session is set according to a request of the UE 100 located within the coverage of the source base station 201, the source MME 511 (or SGSN) stores the result in the UE context. At this time, the UE context may include a MM/EPS bearer context and the like for mobility and session management. Furthermore, a parameter indicating that the established session is a SIPTO-based session, for instance, SIPTO_Session_indicator will be set within the UE context. In other words, the source MME 511 (or SGSN) configures an indication (for instance, SIPTO_Session_indicator) indicating that the established session is a SIPTO-based session within the UE context in the unit of PDN, bearer, or IP address to distinguish it from other general sessions.

While the session is being performed, the UE 100 is moved into the coverage of the target base station 202. At this time, assume that the target base station 202 is connected to a target S-GW 522 and several other S-GWs illustrated in the drawing. Furthermore, the target S-GW 522 is connected to the target MME 512 illustrated in the drawing, and also connected to several other MMEs.

Then, in case of performing handover, the source MME 511 determines a suitable MME to be in charge for the UE 100. At this time, assume that the target MME 512 is determined as the suitable MME according to the determination.

For example, when it is changed from the source MME 511 to the target MME 512 according to the determination, the source MME 511 requests an X2-based handover, an S1-based handover, an inter-RAT handover, and the like, to the target MME 512. During the handover request, the UE context (including MM/EPS bearer context) information may be exchanged. Also, in case of TAU, the UE requests TAU to a target (e)NB, and in this case the target (e)NB will determine the target MME 512.

The target MME 512 acquires UE context information from the source MME 511, and checks whether a session established at the source base station 201 is a SIPTO-based session. Specifically, the target MME 512 checks the SIP- TO_Session_indicator of the UE context information to check that a session established at the source base station 201 is a SIPTO-based session.

Subsequently, the target MME 512 determines serving S-GW or P-GW to be in charge for the UE 100. When selecting the serving S-GW or P-GW, the target MME 512 may consider capability of radio access, QoS, mobility, and the like. Here, the capability of radio access denotes whether there exists any target local P-GW 402 supporting SIPTO in the neighborhood (i.e., the location of a radio access is considered), or whether SIPTO is enabled by operator setting (for instance, whether it is set to support the SIPTO function in the operator setting) or policy. Furthermore, the target MME 512 may acquire subscriber information (whether the SIPTO function is applied/subscribed) to consider it when selecting the target S-GW 522 or P-GW. On the other hand, whether there exists a target local P-GW 402 in the neighborhood may be determined based on the information set by the operator or the information transferred from RAN.

At this time, as an illustration, it is assumed that the target S-GW 522 is determined as the suitable S-GW according to the determination. The target S-GW 522 is located in the neighborhood of the target local gateway 522.

Then the target MME 512 determine whether the SIPTO-based session is moved to be maintained or is deleted and then newly set.

In this manner, the MME taking charge of the UE 100 may be changed from the source MME 511 to the target MME 512, and the S-GW taking charge of the UE 100 may be changed from the source S-GW 521 to the target S-GW 522.

Accordingly, the SIPTO-based session should be newly established in the target S-GW 522. In other words, the previously established SIPTO-based session is deleted (terminated). However, a general session passing through the core network is moved and maintained.

The target MME 512 informs the source MME 511 of a result of the session setting. Then, according to the result, the source MME 511 deletes (or terminates) a SIPTO-based session. Then, the source MME 511 informs the UE 100 of the information of a session that is to be deleted or has been deleted, and transfers result/cause information (for instance, cause or result of the SIPTO parameter). As a result, the UE 100 requests PDN connectivity again in the moved target base station 202 on the basis of the result/cause information to newly create a SIPTO-based session. At this time, the request may be transferred through TAU Accept, Handover Command, and the like.

On the other hand, the source MME 511 does not delete the session by itself, and requests to the UE 100, thereby allowing the UE 100 to delete or (terminate or release) the session.

Hereinafter, each procedure will be described in detail with reference to FIG. 6.

First, if a SIPTO-based session passing through the fixed network as well as a general session passing through the core network is set based on a request of the UE 100 located within the source base station 201, for instance, the coverage of the source (e)NodeB, then the source MME 511 (or SGSN) stores the result in the UE context. At this time, an MM/EPS bearer context or the like is included in the UE context, for mobility and session management. Furthermore, a parameter indicating that the set session is a SIPTO-based session, for instance, SIPTO_Session_indicator, will be set within the UE context. In other words, the source MME 511 (or SGSN) configures an indication indicating that the established session is a SIPTO-based session, for instance, SIPTO_Session_indicator in the unit of PDN, bearer, or ip address within the UE context.

While the session is being performed, the UE 100 is geographically moved.

1) Then, the source base station 201 selects a target base station 202 as an object to be handed over by considering the state of base stations in which the UE is located.

2) The source base station 201 transmits a handover request message to the source MME 511. The handover request message may be a Handover Required message on the basis of the S1-AP protocol. The message may include an id of the target base station 202.

3) Then, the source MME 511 determines a suitable MME to be in charge for the UE among several MMEs managing the target base station 202. Assume that the target MME 512 is determined as the suitable MME according to the determination.

4) Then, the source MME 511 transfers a UE context to the target MME 512. The UE context may be included in a relocation request message, for instance, Forward Relocation Request message to be transmitted. The UE context may include MM/EPS bearer context, and the like. In addition, the UE context may include information or parameter, for instance, SIPTO_Session_indicator, indicating that the session in which the UE 100 is being performed is a SIPTO-based session. At this time, in case where the SIPTO_Session_indicator is set together with the APN information, it may indicate that the session being performed is a SIPTO-based session in the unit of PDN. As an illustration, the UE context may be illustrated in the following Table 1.

TABLE 1

| UE Context |
|---|
| { |
| APN, |
| SIPTO_Session_indicator, |
| EPC Bearer Context |
| } |

Otherwise, the SIPTO_Session_indicator may be set within the UE context together with bearer information. As an illustration, in case where the SIPTO_Session_indicator is set together with the bearer information as illustrated in the following Table 2, it may be shown that the session being performed is a SIPTO-based session in the unit of bearer.

TABLE 2

| UE Context |
|---|
| { |
| APN, |
| EPC Bearer Context |
| { |
| Bearer ID |
| SIPTO_Session_indicator |
| } |
| } |

The MM/EPS bearer context may be configured as illustrated in the following Table 3.

TABLE 3

| Field | Description |
| --- | --- |
| IMSI | As an abbreviation of International Mobile Subscriber Identity, it is a permanent identifier of a subscriber. |
| Tracking Area List | Current tracking area list |
| TAI of last TAU | TAI of the tracking area where the last tracking area update has been started |
| CSG ID | CSG ID known finally when the UE became active |
| CSG membership | CSG membership known finally when the UE became active |
| Access mode | Access mode of ECGI known finally when the UE became active |
| S-GW IP address for S11/S4 | S-GW IP address for S11 and S4 interfaces |
| S-GW TEID for S11/S4 | S-GW tunnel endpoint identifier for S11 and S4 interfaces |
| For each active PDN connection: | |
| APN in Use | APN is used. The APN may include an APN network identifier and an APN operator identifier. |
| SIPTO_Session_indicator | Indicate that the session being performed is SIPTO-based (or SIPTO-enabled). |
| PDN GW Address in Use (control plane) | IP address of PDN GW currently being used for transmitting a signal of the control plane |
| PDN GW TEID for S5/S8 (control plane) | PDN GW tunnel endpoint identifier for S5/S8 interfaces for the control plane |
| For each bearer within the PDN connection: | |
| EPS Bearer ID | EPS bearer identifier uniquely identifies an EPS bearer for one UE connected through E-UTRAN |

5) Then, the target MME 512 checks a parameter of the UE context, for instance, SIPTO_Session_indicator, to check whether a session created in the source base station 201 is a SIPTO-based session.

Subsequently, the target MME 512 determines a serving S-GW or P-GW to be in charge for the UE. When selecting the serving S-GW or P-GW, the target MME 512 may consider capability of radio access, QoS, mobility, and the like. Here, the capability of radio access denotes whether there exists any target local P-GW 402 supporting SIPTO in the neighborhood (i.e., the location of a radio access is considered), or whether SIPTO is enabled by operator setting (for instance, whether it is set to support the SIPTO function in the operator setting) or policy. Furthermore, the target MME 512 may acquire subscriber information (whether the SIPTO function is applied/subscribed) to consider it when selecting the target S-GW 522 or P-GW. The subscriber information (whether the SIPTO function is applied/subscribed) may be acquired in the above process 4. On the other hand, whether there exists a target local P-GW 402 in the neighborhood may be determined based on the information set by the operator or the information transferred from RAN.

If it is changed from the source S-GW 521 to the target S-GW 522 based on the determination, then a handover procedure is carried out for a general session passing through the core network.

On the other hand, if a SIPTO session is deleted by the UE, then a handover procedure is carried out for all sessions while maintaining a current target local P-GW. In this case, the UE may delete a SIPTO session and attempt to connect thereto again subsequent to the handover on the basis of the result/cause information received the process 10 below.

6) The target MME 512 performs a handover procedure for a general session as a result for the session setup.

Specifically, in case where the target S-GW 522 is found as a suitable S-GW in which a target gateway, for instance, a target local P-GW 402, is located as described above, the target MME 512 compares an address of the target local P-GW 402 with an address of the source local P-GW 401 existing within the UE context to determine whether the local P-GW is changed. If it is changed to the target local P-GW 402, then a handover procedure will be carried out only for the general session but the SIPTO sessions will be excluded from the objects to be handed over. In other words, the target MME 512 transmits a create request message for a general session, for instance, Create Session Request, to the target S-GW 522.

On the other hand, if a SIPTO session is deleted by the UE, then a handover procedure is carried out for all sessions while maintaining a current target local P-GW. The request method is same as in the above case.

When the session creation is completed, the target S-GW 522 a bearer create response message (Create Session Response message) or bearer create complete message to the target MME 512.

7) If the target MME 512 receives the bearer create response message or bearer create complete message, then the target MME 512 transmits a handover request message, for instance, Handover Request message, to inform the target base station 202 to be prepared for handover. The handover request message may include an EPS bearer to setup parameter. The EPS bearer to setup parameter may include only general session information to be passed through the core network.

On the other hand, if a SIPTO session is deleted by the UE, then all sessions are handed over, and thus the EPS bearer to setup parameter may include all session information.

8) The target base station 202 transmits a response message, for instance, Handover Request Ack message, to the target MME 512.

9) The target MME 512 transmits information for the result/cause for the session setup, for instance, a result or cause of SIPTO parameter, to the source MME 511.

Specifically, in case where the target S-GW 522 is found as a suitable S-GW in which a target gateway, for instance, a target local P-GW 402, is located as described above, the target MME 512 compares an address of the target local P-GW 402 with an address of the source local P-GW 401 existing within the UE context to determine whether the local P-GW is to be changed. If it is changed to the target local P-GW 402, then the result or cause of SIPTO parameter is transmitted to the source MME 511. The result or cause of SIPTO parameter may be included in a relocation response message, for instance, Forward Relocation Response message. The relocation response message, for instance, Forward Relocation Response message may further include an EPS bearer to setup parameter. The EPS bearer to setup parameter may include only information for a general session to be passed through the core network. The result or cause of SIPTO parameter indicates that a cause excluded from the handover is due to SIPTO.

On the other hand, if a SIPTO session is deleted by the UE, then all sessions are handed over and thus the EPS bearer to setup parameter may include all session information. In addition, the result or cause of SIPTO parameter indicates that a SIPTO session should be deleted and the SIPTO session should be requested again.

10) Upon receiving the relocation response message, the source MME 511 deletes the SIPTO-based session being performed (it is carried out during the processes of 16 through 18. Then, the source MME 511 transmits a handover command, for instance, Handover Command message, to the UE 100 through the source base station 201. The Handover Command message may include the result or cause of SIPTO parameter. Furthermore, the Handover Command message may include a bearer release parameter, for instance, Bearers to Release parameter. The Bearers to Release, which is a parameter transferred at this time, will be a SIPTO session used in the source (e)NodeB.

On the other hand, if a SIPTO session is deleted by the UE, then all sessions are handed over and thus the SIPTO session may not be included in Bearers to Release which is a parameter being transferred. In addition, the result or cause of SIPTO parameter indicates that the SIPTO session should be deleted and the session should be requested again.

11) The UE 100 receives the handover command message, and checks the result or cause of SIPTO parameter, and then releases the relevant bearer in the radio section if the session being performed is a SIPTO-based session. Then, the UE 100 transmits a handover confirm message, for instance, Handover Confirm message, to the target base station 202. On the other hand, the UE 100 requests new PDN connectivity again during the processes 19 through 21 to create the deleted session again in the target base station 202. It will be described later.

On the other hand, if a SIPTO session is deleted by the UE, then all sessions are handed over and thus the SIPTO session in the radio section is not deleted and all bearers are handed over.

12-13) The target base station 202 transmits the handover confirm message to the target MME 512, and the target MME 512 transmits a relocation complete notification message, for instance, Forward Relocation Complete message to the source MME 511 and receives a response message.

14-15) The target MME 512 transmits a modify bearer request message, for instance, Modify Bearer Request message, to the target S-GW 522 to modify the target S-GW 522 and the created bearer. At this time, to allow the target local P-GW 402 to transmit the downlink data to the UE 100, an address of the target base station and TEID may be included in the modify bearer request message. The target S-GW 522 transmits the modify bearer request message to the target local P-GW 402. The target local P-GW 402 transmits a modify bearer response message, for instance, Modify Bearer Response message, in response to the modify bearer request message, and the target S-GW 522 transfers the modify bearer response message to the target MME 512.

16-18) On the other hand, the source MME 511 transmits Delete Session Request message to delete a session with the source S-GW 521. The source S-GW 521 deletes a session with the source local P-GW 401. Then, the source S-GW 521 transmits a Delete Session Response message. On the other hand, the source MME 511 transmits a UE context release request message, for instance, UE Context Release Command message, to the source base station 201 and receives a response message.

19-21) The UE 100 transmits a PDN Connectivity Request message to the target MME 512 based on the received result/cause information to create a SIPTO-based session in the target base station 202. The PDN Connectivity Request message is based on the NAS protocol, and includes APN. Then, the UE 100 receives a PDN Connectivity Accept message from the target MME 512.

On the other hand, up to this point, it has been described a case where the UE 100 is moved into the coverage of the target base station 202 while performing a session within the coverage of the source base station 201. However, the foregoing description may be also applicable to a case where the UE 100 is moved into the coverage of the target base station 202 in a state that the UE 100 does not perform a session, for instance, an idle mode. If the UE is moved into the coverage of the target base station 202 in an idle mode, then the foregoing UE context may be exchanged when the operation such as TAU or RAU is carried out. In other words, the TAU or RAU operation is carried out when the UE is moved from a current cell to another cell to get out of the area being managed by the current MME or SGSN, which is a process of registering location information in a new MME or SGSN. At this time, contrary to the handover, the UE transfers a TAU/RAU Request message to a target cell to request, and the target cell transfers the message to a target MME/SGSN. The target MME/SGSN obtains a source MME/SGSN using a temporary identifier of the UE included in the transferred message, and the target MME/SGSN requests a UE context to the source MME/SGSN. Then, the source MME/SGSN transfers a UE context to the target MME/SGSN through a Context Response message.

In case of the TAU or RAU operation, there is a difference for each of the following processes when compared to the foregoing handover. It is a difference depending on the initialized subject due to the characteristic of mobility in an idle mode and mobility in a connected mode and a difference in actually used commands. The basic concept of the invention is same.

1-3) The UE is in an idle mode, and at this time requests TAU to a target (e)NB. The target (e)NB determines a target MME based on the location.

4) The target MME requests a request message, for instance, Context Request, to the source MME to obtain a UE context. The source MME transfers Context Response wherein the UE context is included in the message. In other words, it may be carried out in two steps. In addition, the target MME transfers Context Acknowledge to the source MME wherein it is transferred together with a serving GW change indication. The source MME deletes sessions at the side of source through the indication.

9-10) The target MME sends a TAU Accept message to the UE 100. At this time, the UE 100 receives the TAU Accept message, and checks the result or cause of SIPTO parameter, and releases the relevant bearer in the radio section if the session being performed is SIPTO-based. At this time, the EPS bearer status is transferred together wherein it is only displayed for a general session. In other words, the bearers not included in the EPS bearer status will be released. On the other hand, the UE 100 requests new PDN Connectivity again during the processes 19 through 21 to create the deleted session again in the target base station 202.

As described above, though MME and S-GW are illustrated based on EPC in FIG. 6, the concept of the present invention may be applicable to UMTS. In case of UMTS, the MME and the S-GW may be integrated into SGSN. Accordingly, signal transmission and reception between the MME and the S-GW illustrated in FIG. 6 will not be carried out, but processed within the SGSN.

Figure 8:
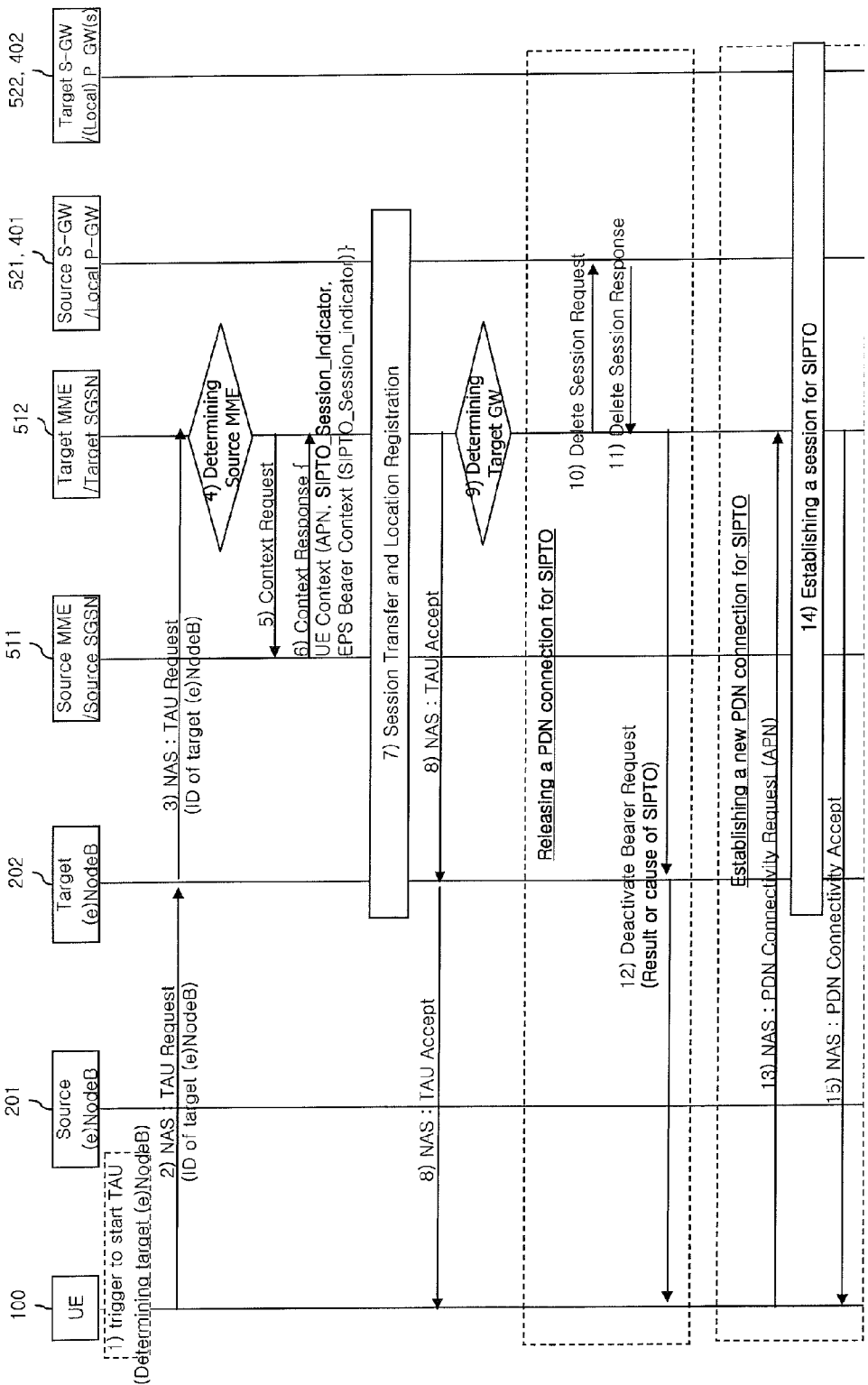
FIG. 8 is a flow chart illustrating a control procedure of SIPTO according to a second embodiment of the present invention.

FIG. 8 is a flow chart illustrating a control procedure of SIPTO according to a second embodiment of the present invention.

According to the second embodiment illustrated in FIG. 8, when exchanging a UE context in the TAU/RAU procedure, SIPTO_Session_indicator may be included to be exchanged.

Specifically, the target MME receives a UE context which includes the SIPTO_Session_indicator during the TAU/RAU or handover. Subsequently, the MME determines a target S-GW or local P-GW based on the information or previously disclosed conditions, and deletes the existing session and transfers Deactivate EPS Bearer Context Request including a result or cause of SIPTO parameter to the UE 100 if the session being performed is SIPTO-based, thereby requesting new PDN Connectivity again. The process also has the same concept as the process of TAU/RAU and handover.

Hereinafter, prior to specifically describing with reference to the drawing, the operation according to the second embodiment will be briefly described as follows.

If a SIPTO-based session is set according to a request of the UE 100 located within the coverage of the source base station 201, then the source MME 511 (or SGSN) stores the result in the UE context. At this time, the UE context may include a MM/EPS bearer context and the like for mobility and session management. Furthermore, a parameter indicating that the established session is a SIPTO-based session, for instance, SIPTO_Session_indicator, will be set within the UE context. In other words, the source MME 511 (or SGSN) configures an indication (for instance, SIPTO_Session_indicator) indicating that the established session is a SIPTO-based session within the UE context in the unit of PDN, bearer, or ip address to distinguish it from other general sessions.

In the idle mode, the UE 100 is moved into the coverage of the target base station 202. At this time, assume that the target base station 202 is connected to a target S-GW 522 and several other S-GWs illustrated in the drawing. Furthermore, the target S-GW 522 is connected to the target MME 512 illustrated in the drawing, and also connected to several other MMEs.

Then, in case of performing tracking area update (TAU), the UE 100 determines a target base station 202 and the target base station 202 determines a serving MME. At this time, assume that the target MME 512 is determined as a suitable MME according to the determination.

For example, when it is changed to the target MME 512 according to the determination, the UE requests TAU to a target (e)NB, and in this case the target (e)NB will determine the target MME 512.

The target MME 512 acquires UE context information from the source MME 511, and checks whether a session created from the source base station 201 is a SIPTO-based session. Specifically, the target MME 512 checks the SIPTO_Session_indicator of the UE context information to check that a session created from the source base station 201 is a SIPTO-based session, thereby terminating the TAU process. Otherwise, checking whether the managed session is a SIPTO-based session may be carried out subsequent to the completion of the TAU process.

Subsequently, based on the checking of the SIPTO-based session, the target MME 512 determines a serving S-GW or P-GW to be in charge for the UE. When selecting the serving S-GW or P-GW, the target MME 512 may consider capability of radio access, QoS, mobility, and the like. Here, the capability of radio access denotes whether there exists any target local P-GW 402 supporting SIPTO in the neighborhood (i.e., the location of a radio access is considered), or whether SIPTO is enabled by operator setting (for instance, whether it is set to support the SIPTO function in the operator setting) or policy. Furthermore, the target MME 512 may acquire subscriber information (whether the SIPTO function is applied/subscribed) to consider it when selecting the target S-GW 522 or P-GW. On the other hand, whether there exists a target local P-GW 402 in the neighborhood may be determined based on the information set by the operator or the information transferred from RAN.

At this time, as an illustration, it is assumed that the target S-GW 522 is determined as the suitable S-GW according to the determination. The target S-GW 522 is located in the neighborhood of the target local gateway 522.

Then, the target MME 512 moves the SIPTO-based session, and then determines whether it is to be maintained or deleted and then newly set.

Accordingly, the SIPTO-based session should be newly created in the target S-GW 522. In other words, the previously created SIPTO-based session is deleted (terminated).

The target MME 512 deletes (or terminates or releases) a SIPTO-based session. Then, the target MME 512 informs the UE 100 of the information of a session that is to be deleted or has been deleted, and transfers result/cause information (for instance, cause or result of the SIPTO parameter). As a result, the UE 100 requests PDN connectivity again in the moved target base station 202 on the basis of the result/cause information to newly create a SIPTO-based session.

Hereinafter, each procedure will be described in detail with reference to FIG. 8.

First, if a SIPTO-based session passing through the fixed network is set, then the source MME 511 (or SGSN) stores the result in the UE context. At this time, an MM/EPS bearer context or the like is included in the UE context, for mobility and session management. Furthermore, a parameter indicating that the set session is a SIPTO-based session, for instance, SIPTO_Session_indicator, will be set within the UE context. In other words, the source MME 511 (or SGSN) configures an indication indicating that the established session is a SIPTO-based session, for instance, SIPTO_Session_indicator in the unit of PDN, bearer, or ip address within the UE context.

While the session is being performed, the UE 100 is geographically moved.

1) Then, the UE selects a target base station 202 to perform TAU/RAU by considering the current state of neighboring base stations.

2) The UE transmits a TAU request message to the target base station 202. The TAU request message may be a TAU Request message based on the NAS protocol.

3) Then, the target base station 202 determines a suitable MME among several MMEs. Assume that the target MME 512 is determined as the suitable MME according to the determination.

4) Then, the target MME 512 determines a source MME 511 using a temporary identifier of the UE included in the transferred message.

5) The target MME 512 requests a request message, for instance, Context Request, to the source MME 511 to acquire a UE context.

6) Then, the source MME 511 transfers a UE context to the target MME 512. The UE context may be included in a context response message, for instance, Context Response message to be transmitted. The UE context may include MM/EPS bearer context, and the like. In addition, the UE context may include information or parameter, for instance, SIPTO_Session_indicator, indicating that the session in which the UE 100 is being performed is a SIPTO-based session. At this time, in case where the SIPTO_Session_indicator is set together with the APN information, it may indicate that the session being performed is a SIPTO-based session in the unit of PDN. As an illustration, the UE context may be illustrated in the following Table 4.

TABLE 4

```
UE Context
{
APN,
SIPTO_Session_indicator,
EPC Bearer Context
}
```

Otherwise, the SIPTO_Session_indicator may be set within the UE context together with bearer information. As an illustration, in case where the SIPTO_Session_indicator is set together with the bearer information as illustrated in the following Table 5, it may be shown that the session being performed is a SIPTO-based session in the unit of bearer.

TABLE 5

```
UE Context
{
  APN,
  EPC Bearer Context
  {
```

TABLE 5-continued

```
    Bearer ID
    SIPTO_Session_indicator
  }
}
```

The MM/EPS bearer context may be configured as illustrated in the following Table 6.

TABLE 6

| Field | Description |
|---|---|
| IMSI | As an abbreviation of International Mobile Subscriber Identity, it is a permanent identifier of a subscriber. |
| Tracking Area List | Current tracking area list |
| TAI of last TAU | TAI of the tracking area where the last tracking area update has been started |
| CSG ID | CSG ID known finally when the UE became active |
| CSG membership | CSG membership known finally when the UE became active |
| Access mode | Access mode of ECGI known finally when the UE became active |
| S-GW IP address for S11/S4 | S-GW IP address for S11 and S4 interfaces |
| S-GW TEID for S11/S4 | S-GW tunnel endpoint identifier for S11 and S4 interfaces |
| For each active PDN connection: | |
| APN in Use | APN is used. The APN may include an APN network identifier and an APN operator identifier. |
| SIPTO_Session_indicator | Indicate that the session being performed is SIPTO-based (or SIPTO-enabled). |
| PDN GW Address in Use (control plane) | IP address of PDN GW currently being used for transmitting a signal of the control plane |
| PDN GW TEID for S5/S8 (control plane) | PDN GW tunnel endpoint identifier for S5/S8 interfaces for the control plane |
| For each bearer within the PDN connection: | |
| EPS Bearer ID | EPS bearer identifier uniquely identifies an EPS bearer for one UE connected through E-UTRAN |

7-8) The session is moved according to the existing order and a TAU procedure such as location registration or the like is carried out, and the target MME sends a TAU Accept message to the UE 100.

9) Then, the target MME 512 checks a parameter of the UE context, for instance, SIPTO_Session_indicator, to check whether there is a SIPTO-based session in the moved session.

If there is a SIPTO-based session, the target MME 512 determines a serving S-GW or P-GW to be in charge for the UE. When selecting the serving S-GW or P-GW, the target MME 512 may consider capability of radio access, QoS, mobility, and the like. Here, the capability of radio access denotes whether there exists any target local P-GW 402 supporting SIPTO in the neighborhood (i.e., the location of a radio access is considered), or whether SIPTO is enabled by operator setting (for instance, whether it is set to support the SIPTO function in the operator setting) or policy. Furthermore, the target MME 512 may acquire subscriber information (whether the SIPTO function is applied/subscribed) to consider it when selecting the target S-GW 522 or P-GW. The subscriber information (whether the SIPTO function is applied/subscribed) may be acquired in the above process 6. On the other hand, whether there exists a target local P-GW 402 in the neighborhood may be determined based on the information set by the operator or the information transferred from RAN.

10-11) The target MME 512 deletes the SIPTO-based session being performed if it is determined to select a new GW in the process 9. The target MME 512 sends a Delete Session Request message to delete the session. The source S-GW 521 deletes a session with the source S-GW 521 and the source local P-GW 401. Then, the source S-GW 521 transmits a Delete Session Response message.

12) The target MME 512 transfers Deactivate EPS Bearer Context Request including a result or cause of SIPTO parameter to the UE 100, thereby requesting new PDN Connectivity again.

13-15) The UE 100 transmits a PDN Connectivity Request message to the target MME 512 based on the received result/cause information to create a SIPTO-based session in the target base station 202. The PDN Connectivity Request message is based on the NAS protocol, and includes APN. The target MME 512 determines a target S-GW or local P-GW based on the information and previously disclosed conditions to newly configure a SIPTO-based session. Then, the target MME 512 transfers a PDN Connectivity Accept message to the UE 100.

As described above, though MME and S-GW are illustrated on the basis of EPC in FIG. 8, the concept of the present invention may be also applicable to UMTS. In case of UMTS, both the MME and S-GW can be integrated into SGSN. As a result, the signal transmission and reception between the MME and the S-GW illustrated in FIG. 6 will not be carried out, but all processed within the SGSN.

Figure 9:
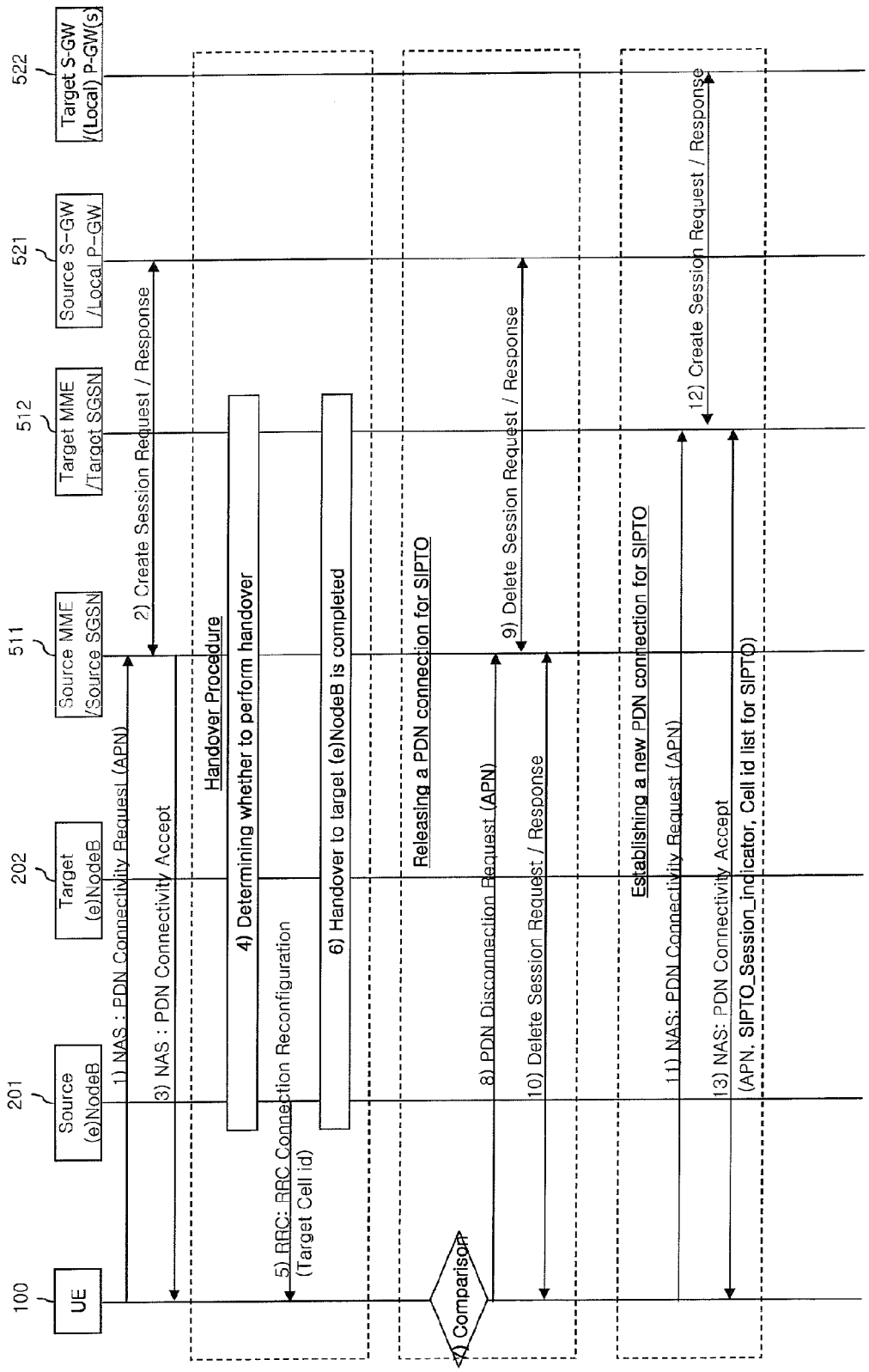
FIG. 9 is a flow chart illustrating a control procedure of SIPTO according to a third embodiment of the present invention.

FIG. 9 is a flow chart illustrating a control procedure of SIPTO according to a third embodiment of the present invention.

Hereinafter, prior to specifically describing with reference to the drawing, the operation according to the third embodiment will be briefly described as follows.

Other than the first and the second embodiment, the session creation and mobility management is enabled according to the third embodiment. In other words, according to the third embodiment, the UE 100 may actively determine to delete and reconfigure a SIPTO-based session.

For this purpose, if the SIPTO-based session is created, then a server within a network informs the UE 100 of information on the area to which SIPTO is applicable in the neighborhood of the UE. In other words, a SIPTO-enabled cell id list is transferred from the server within the network, for instance, RAN or MME/SGSN, to the UE 100 in the form of CGI (Cell Global ID), ECGI (Evolved-CGI), TA (Tracking Area) list, RA (Routing Area). In addition, the server within the network, for instance, RAN or MME/SGSN, transfers SIPTO_Session_indicator indicating that the object session (in the unit of PDN, bearer, IP flow) is subject to SIPTO.

Then, the UE 100 determines whether it gets out of the set SIPTO region with reference to the received cell id list when moving into a cell.

If the UE 100 gets out of the set SIPTO region, then the SIPTO-based session currently being performed is deleted and a session is reconfigured. Such an operation is due to subscription information (rate preference, etc.) and operator policy wherein setting as to whether the SIPTO function is applicable to the UE is necessary. In case of SIPTO, the connection maintains to be serviced even though it gets out of the set SIPTO region, but it will reduce the advantage obtained by limiting the region if it gets out of the set SIPTO region. Accordingly, the SIPTO session should be deleted and connected again if the UE 100 gets out of a specific region, and it may be carried out by the UE using the determination based on the information transferred from the network.

Hereinafter, it will be described with reference to FIG. 8. However, each message will not be described in detail, but the description of FIGS. 6 and 7 will be applied thereto.

1) The UE 100 requests PDN Connectivity to the source MME 511 when creating Attach or PDN.

2) The source MME 511 selects a source S-GW 521 by considering the transferred APN, capability of radio access, QoS, mobility, and the like. Here, the capability of radio access denotes the capability according to whether there exists any SIPTO-enabled local gateway in the neighborhood, operator setting (on/off) or policy to support the SIPTO function in the current radio access, and the like. Also, the source S-GW 521 is selected by considering information (whether the SIPTO function is applied/subscribed). Subsequent to selecting the source S-GW 521, the source MME 511 transmits a Create Session Request message to configure a new session to the source S-GW 521, and receives a Create Session Response message.

3) Then, the source MME 511 transmits a PDN Connectivity Accept message to inform the UE 100 of a result of the session setup (for instance, a general session passing through the core network and a SIPTO-based session is set). The message may include APN and SIPTO_Session_indicator. In other words, the APN and SIPTO_Session_indicator indicates that sessions (or bearers) belong to the relevant session are subject to SIPTO. On the other hand, the source MME 511 is allowed to include a list of the areas in which SIPTO sessions can be performed within the message. The list will be used later as a basis of determination for deleting and requesting new PDN connectivity a current session when the UE is moved into another cell. The list may be CGI, ECGI, TA list, and RA.

4-6) On the other hand, the UE 100 moves into the coverage of another base station. Then, it is determined whether handover to the UE 100 is carried out. Based on the determination, the source base station 201 transmits a RRC Connection Reconfiguration message to the UE 100. The RRC Connection Reconfiguration message may include a cell ID of the determined target base station. On the other hand, handover to the target base station, for instance, target (e)NodeB, is carried out.

7) The UE 100 compares a list of cell IDs for the SIPTO and the cell ID of the target base station 202. If The cell ID of the target base station 202 is not identical to any one of the cell IDs within the list, then the SIPTO-based session being performed will be deleted based on the following procedures 8 through 10, and the UE 100 will request to the target MME 512 to create new PDN connectivity based on the following procedures 11 through 13.

8) The UE 100 transmits a message for requesting the deletion of a session currently being performed to the source MME 511. The message for requesting the deletion may be a message for deleting in the unit of bearer. Otherwise, the message for requesting the deletion may be a PDN Disconnection Request message for deleting in the unit of PDN. The PDN Disconnection Request message may include APN information.

9) Then, the source MME 511 transmits a Delete Session Request message to the source S-GW 521, and receives a response message.

10) The source MME 511 transmits a Delete Session Request message to the UE 100. Then, the UE 100 deletes the session being performed and transmits a response message to the source MME 511.

11) On the other hand, the UE 100 transmits a PDN Connectivity Request message to the target MME 512 to create a SIPTO-based session in the target base station 202. The PDN Connectivity Request message is based on the NAS protocol, and includes APN.

12) Then, the target MME transmits a Create Session Request message to the target S-GW 522 to configure a new session, and receives a Create Session Response message.

13) The target MME 512 transmits a response message, for instance, PDN Connectivity Accept message to the UE 100. The PDN Connectivity Accept message may include APN information, SIPTO_Session_indicator. In addition, the PDN Connectivity Accept message may include a list for IDs of the cells that can maintain a newly created SIPTO-based session.

On the other hand, in the foregoing description, it has been described a case where the UE 100 is moved into the coverage of the target base station 202 while performing a session within the coverage of the source base station 201. However, the foregoing description may be also applicable to a case where the UE 100 is moved into the coverage of the target base station 202 in a state that the UE 100 does not perform a session, for instance, an idle mode. If the UE is moved into the coverage of the target base station 202 in an idle mode, then the foregoing UE context may be exchanged when the operation such as TAU or RAU is carried out.

As described up to this point, a method according to the present invention can be realized by software, hardware, or their combination. For example, a method according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC). It will be described with reference to FIG. 10.

Figure 10:
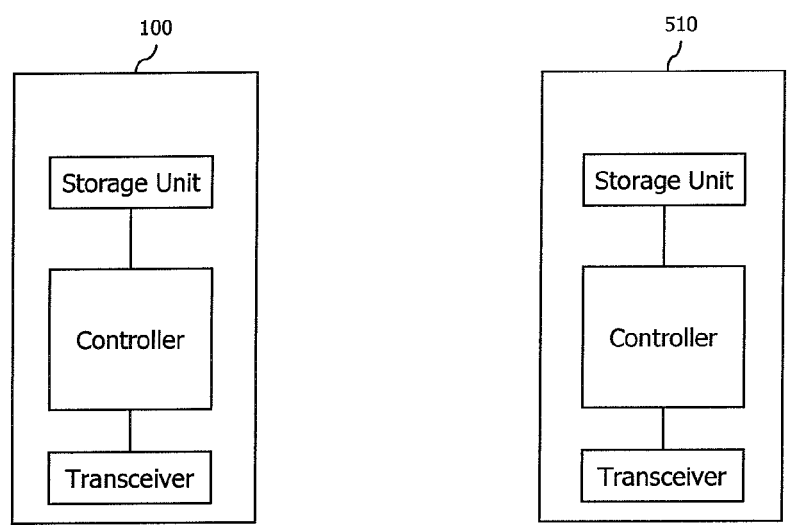
FIG. 10 is a configuration block diagram of UE 100 and MME 510.

FIG. 10 is a configuration block diagram of the UE 100 and the MME 510 according to the present invention.

As illustrated in FIG. 10, the UE 100 may include a storage unit, a controller, and a transceiver. Also, the MME 510 may include a storage unit, a controller, and a transceiver.

The storage units store a software program in which a method illustrated in FIGS. 5, 6, 8 and 9 is realized.

Each of the controllers controls the storage units and the transceivers, respectively. Specifically, the controllers implement each of the foregoing methods stored in the storage units, respectively. Then, each of the controllers transmits the foregoing signals through the transceivers.

Though preferred embodiments of present invention are exemplarily described as disclosed above, the scope of the invention is not limited to those specific embodiments, and thus various modifications, variations, and improvements can be made to the present invention without departing from the spirit of the invention, and within the scope of the appended claims.

What is claimed is:

1. A method of controlling a session in a mobile communication network, the method performed by serving server that takes charge of a control plane and comprising:
   receiving a tracking area update (TAU) request message of a terminal via a target base station;
   obtaining subscription information indicating that the session for the terminal is to be passed through a path over nodes within a fixed network different from the mobile communication network;
   determining whether gateway relocation is necessary;
   releasing a previously established session for the terminal;
   transmitting an accept message to the terminal via the target base station, the accept message comprising information for a processing result; and
   establishing a session that passes through the path over the nodes within the fixed network based on the subscription information,
   wherein the subscription information includes a parameter that is related to Selected Internet Protocol Traffic Offload (SIPTO) and indicates whether the session is allowed for SIPTO,
   wherein the subscription information is either set together with an access point name (APN) or set in a unit of bearer, and
   wherein releasing the previously established session comprises releasing at least one session associated with the APN among sessions in which the terminal is performing if the subscription information is set together with the APN.

2. The method of claim 1, wherein the accept message is a TAU Accept message or a Deactivate Evolved Packet System (EPS) Bearer Context Request message.

3. The method of claim 1, wherein the TAU request message is a Non-Access Stratum (NAS)-based TAU Request message.

4. The method of claim 1, further comprising determining, a target gateway based on the subscription information.

5. The method of claim 1, wherein:
   the serving server is a mobility management entity (MME); and
   the target base station is an (e)NodeB.

6. The method of claim 1, wherein releasing the previously established session further comprises
   releasing all sessions in which the terminal is performing in the unit of bearer if the subscription information is set in the unit of bearer.

7. The method of claim 1, wherein the processing result is a result or cause of the parameter.

8. The method of claim 1, further comprising:
   determining a target gateway based on capability of radio access that indicates whether any target local gateway supporting SIPTO exists.

9. A method of controlling a session in a mobile communication network, the method performed by a serving server that takes charge of a control plane and comprising:
   receiving a handover request message from a source base station that performs the session with a terminal, the handover request message comprising an ID of a target base station;
   determining another server that is to take charge of the control plane for the target base station, wherein the session is established to be passed through a path over nodes within a fixed network different from the mobile communication network;
   transmitting a relocation request message comprising subscription information to the determined another server;
   receiving a relocation response message comprising information for a processing result;
   releasing the session; and
   transmitting a handover command message to the terminal via the source base station, the handover command message comprising a processing result,
   wherein the subscription information includes a parameter that is related to Selected Internet Protocol Traffic Offload (SIPTO) and indicates whether the session is allowed for SIPTO,
   wherein the subscription information is either set together with an access point name (APN) or set in a unit of bearer, and
   wherein releasing the session comprises releasing at least one session associated with the APN among sessions in which the terminal is performing if the subscription information is set together with the APN,
   wherein the subscription information is either set together with an access point name (APN) or set in a unit of bearer, and
   wherein releasing the previously established session comprises releasing at least one session associated with the APN among sessions in which the terminal is performing if the subscription information is set together with the APN.

10. The method of claim 1, wherein releasing the session further comprises releasing all sessions in which the terminal is performing in the unit of bearer if the subscription information is set in the unit of bearer.

11. The method of claim 9, wherein the processing result is a result or cause of the parameter.

12. The method of claim 9, further comprising:

determining a target gateway based on capability of radio access that indicates whether any target local gateway supporting SIPTO exists.

13. A server for taking charge of a control plane within a mobile communication network; the server comprising:

a transceiver configured to at least transmit information; and a processor configured to:

determine another server taking charge of the control plane for a target base station and control the transceiver to transmit a relocation message comprising subscription information to the determined another server if a handover request message comprising an ID of the target base station is received from a source base station that is performing a session with a terminal, and release the session and control the transceiver to transmit a handover command message comprising a processing result to the source base station if a relocation response message comprising information for the processing result is received from the determined another server, wherein the subscription information includes a parameter that is related to Selected Internet Protocol Traffic Offload (SIPTO) and indicates whether the session is allowed for SIPTO, wherein the subscription information is either set together with an access point name (APN) or set in a unit of bearer, and wherein releasing the previously established session comprises releasing at least one session associated with the APN among sessions in which the terminal is performing if the subscription information is set together with the APN, wherein the subscription information is either set together with an access point name (APN) or set in a unit of bearer, and wherein releasing the previously established session comprises releasing at least one session associated with the APN among sessions in which the terminal is performing if the subscription information is set together with the APN.

14. The server of claim 13, wherein:

the determined another server is a mobility management entity (MME); and the source base station and the target base station are each an (e)NodeBs.

15. The server of claim 13, wherein the processing result is for a SIPTO-based session and is a result or cause of the parameter.

* * * * *